United States Patent [19]
Reitz et al.

[11] 3,717,983
[45] Feb. 27, 1973

[54] CONTROL APPARATUS FOR A HARVESTING MACHINE
[75] Inventors: Werner Reitz, 7 Stuttgart 31; Günther Schwerin, 7012 Fellbach, both of Germany
[73] Assignee: Robert Bosch GmbH, Stuttgart, Germany
[22] Filed: Nov. 1, 1971
[21] Appl. No.: 194,225

[30] Foreign Application Priority Data
Nov. 2, 1970 Germany....................P 20 53 815.2

[52] U.S. Cl..............................56/208, 56/DIG. 15
[51] Int. Cl..............................................A01d 67/00
[58] Field of Search......................56/10.4, 208–217, 56/DIG. 15

[56] References Cited
UNITED STATES PATENTS
3,568,420   3/1971   Hofer et al. .............................56/208

Primary Examiner—Louis G. Mancene
Assistant Examiner—J. A. Oliff
Attorney—Michael S. Striker

[57]   ABSTRACT

A control apparatus for lifting and lowering the mowing platform of a harvesting machine having a first housing for a control valve controlling the flow of pressure fluid from a pump into working conduits for the hydraulic lifting motor of the platform and a second housing attached to the first housing, and enveloping the cylinder of a pressure-responsive piston, a location-representing linkage connected with the mowing platform, and a regulator controlled by the pressure-responsive piston and by the location-representing linkage to operate the control valve by a part acting on a control valve slide portion of the control valve, projecting out of the first housing into the second housing. A manually operated lever controls the regulator to obtain a position of the mowing platform spaced from the ground.

13 Claims, 3 Drawing Figures

3,717,983

CONTROL APPARATUS FOR A HARVESTING MACHINE

BACKGROUND OF THE INVENTION

The present invention is concerned with a hydraulic lifting apparatus for a harvesting machine by which the frame of the mowing means can be raised and lowered in accordance with ground conditions, or under manual control. In machines of this type, a hydraulic lifting motor is provided between the mowing means and the vehicle frame by which the mowing means is partly supported while sliding on the ground, or fully supported if raised above the ground. The flow to and from the hydraulic lifting motor is controlled by control valve means to which a pump supplies pressure fluid which is returned to a container from which the pump draws fluid. Depending on the pressure in the lifting motor, and on the location of the mowing means in relation to the frame of the vehicle, a regulating means is influenced to adjust the control valve means accordingly.

The German publication 1,582,161 discloses a hydraulic lifting apparatus for a harvesting machine in which the pressure-responsive means is separately mounted, and requires additional attaching means and conduits and sealing means for avoiding leakage. The range of adjustment of the pressure-responsive means is comparatively small so that mowing means or different width, of for different grains, can be used with the apparatus only to a limited extent.

SUMMARY OF THE INVENTION

It is one object of the invention to overcome the disadvantages of the control apparatus for harvesting machines according to the prior art, and to provide a controlled lifting apparatus for the mowing means of a harvesting machine which can be used with mowing means of different width and with different grains.

Another object of the invention is to provide an apparatus of compact construction taking up little space, and operating reliably under rough conditions. Furthermore it is an object of the invention to provide an apparatus of the described type which has two free pipes and sealing points so that leakage and a great number of connectors can be avoided.

Another object of the invention is to provide the regulating means in the form of regulating linkages of low friction.

Another object of the invention is to make the pressure-depending regulating linkage adjustable without changing its length.

A further object of the invention is to provide a manually operated means for setting the machine to a desired position, and which can be arrested in a selected position in a simple, reliable and efficient manner.

With these objects in view, control valve means for pressure fluid are mounted in a first housing, and a regulating linkage is mounted in a second housing adjacent the first housing, and has a regulating means one end of which is pivotally connected with a location-representing means pivotally mounted in the second housing, while its other end is pivotally connected with a pressure-responsive means. The regulating means is connected by an intermediate link with a connector link which is connected with a means for setting a desired value, and with a movable operating means which operates a control slide of the control valve means. A pressure-responsive means is moved by the pressure in a pressure chamber which communicates with the lifting cylinder of the lifting motor of the mowing means, and is biased against the pressure prevailing in the pressure chamber by a spring which has a non-linear curve characteristic of its spring force, and which is furthermore adjustable.

In a lifting apparatus with pressure-responsive regulation, it is a particular advantage if the total length of the pressure-depending regulating linkage remains independent of the prevailing pressure, so that the same amount of space is required on the harvesting machine. This is obtained by supporting one end of the spring of the pressure-responsive means on a disk which can be threaded into a bore in the second housing. An elongated stop member turns with the disk and serves as a stop for the pressure-responsive means. Adjusting means for the stop are located outside of the second housing for manual operation.

Generally speaking, a control apparatus for the frame of the mowing means of a harvesting machine according to the invention comprises a hydraulic lifting motor; mowing means at least partly supported by the lifting motor and normally located on the ground; a first housing, and a second housing secured to the first housing adjacent the same; conduit means partly located in the first housing and connected with said lifting motor, and including a conduit in the second housing; control valve means located in the first housing for controlling the flow through the conduit means to the lifting motor; a source of pressure fluid supplying pressure fluid to the control valve means; pressure-responsive means located in the second housing and including a pressure chamber connected by said conduit with the conduit means in the first housing so that the pressure-responsive means senses the pressure in the lifting motor; and a regulating device in the second housing including a movable regulating means connected with the pressure-responsive means location-representing means connecting the mowing device with the regulating means, and operating means connected with and controlled by the regulating means, and being operatively connected with the control valve means for operating the same.

Upon a load variation of the lifting motor due to ground conditions, the pressure-responsive means and the location-representing means place the regulating means in a regulating position controlling the operating means to operate the control valve means. In this manner, the flow of pressure fluid to the lifting motor is varied to effect a pressure adjustment of the lifting motor compensating the load variation.

In the preferred embodiment, the regulating means is a regulating lever having one end connected with a pressure-responsive piston of the pressure-responsive means. The location-representing means include a location-representing lever pivotally connected to the other end of the regulating lever, the regulating device includes an intermediate link pivotally connected at one end with the regulating lever intermediate the ends thereof, and a connecting link pivotally connected at one end with the other end of the intermediate link, a lever for representing a desired value, and manually operated means for setting the value-representing lever. The connecting link has a guideway and the value-representing lever has a guiding projection guided in the guideway. A shaft is secured to the value-representing lever, and a setting member is carried by a shaft and located in a bore of the second housing and having an end portion projecting out of the second housing, and another end portion located in the second housing and forming a guideway in which the value-representing lever is non-rotatably mounted.

The connecting link and the intermediate link connect the regulating lever with an operating lever having a camming surface cooperating with an abutment on a control valve slide which is displaced in accordance with the displacement of the regulating lever. The control valve slide has a portion with an abutment projecting out of the first housing into the second housing for engagement by the camming face of the operating lever.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
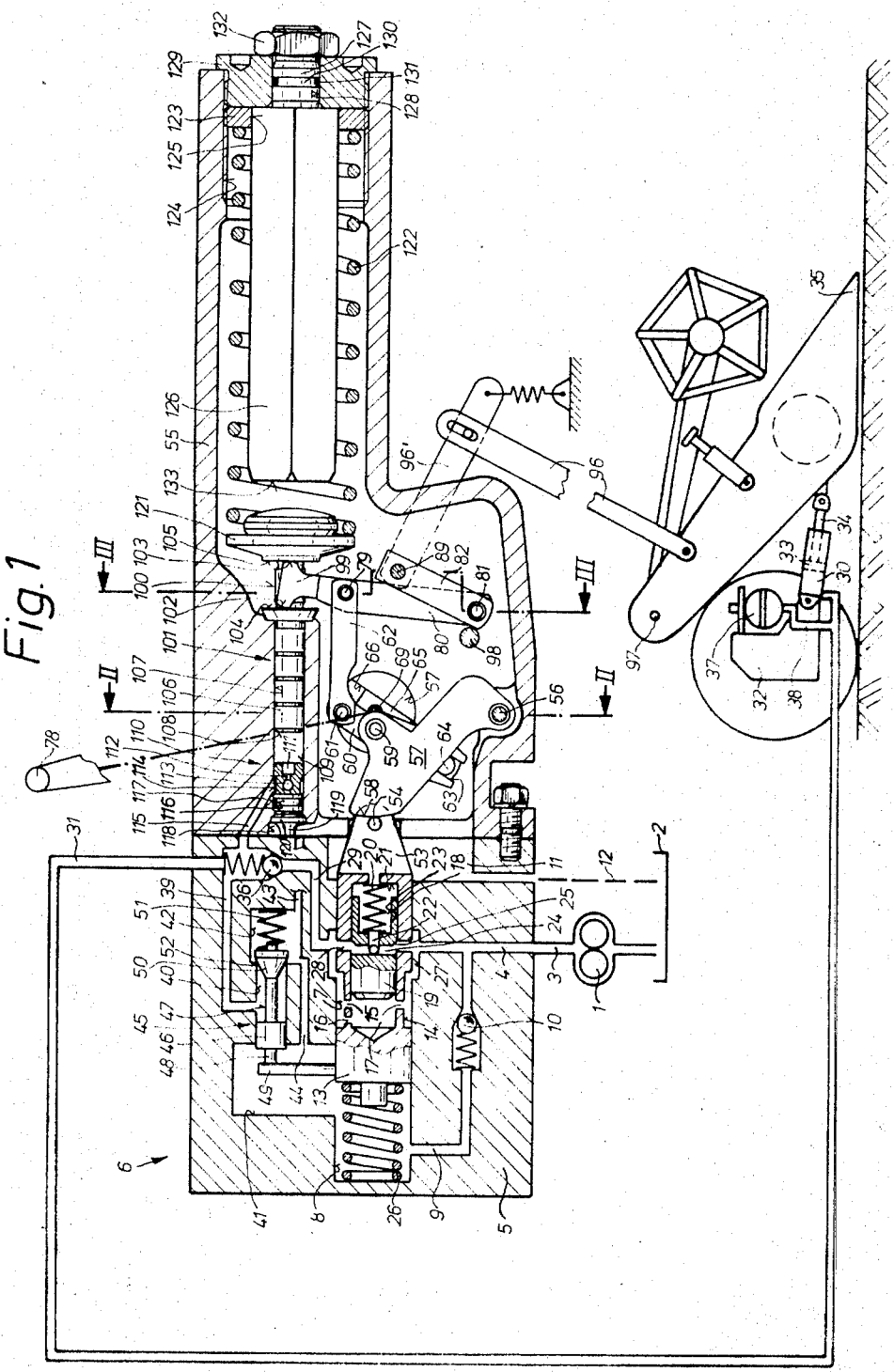
FIG. 1 is a fragmentary schematic sectional view of an apparatus according to the invention.

Referring now to the drawings, and particularly to FIG. 1, the apparatus has a first housing 5, and a second housing 55 secured to housing 5 by screws. The first housing 5 contains conduits controlled by control valve means 13, 19, 45, 10, 36 for controlling the flow in the conduit means to a working conduit 31 which is connected with the cylinder 30 of a hydraulic lifting motor which has a piston 33 with a piston rod 34 connected with mowing means 35 which are pivotable about pivot means 97, and can be lifted and lowered in relation to the ground by operation of the lifting motor 30, 33, 34.

A pump 1 pumps pressure fluid out of a container 2 into a pressure conduit 3 which opens into a pressure channel 4 in housing 5 which has a control bore 7 whose end portion 8 is connected by a channel 9 through a check valve 10 with pressure channel 4. Check valve 10 serves as a safety valve and opens end portion 8 of control bore 7. A first control slide 13 is slidingly guided in control bore 7, and controls the control means 6 since its longitudinal movement causes a shifting of the flow of pressure fluid. Control slide 13 has an annular recess 14 which is connected by ducts 15, 16 with a chamber 17 formed at the inner end of a longitudinal bore 18 in the first control slide 13.

A second control slide 19 is slidingly guided in the longitudinal bore 18, and is biased by a spring 20, abutting a shoulder of the longitudinal bore 18, into chamber 17. The second control slide 19 has in its end remote from chamber 17, a recess 23 in which spring 20 is located, and also several transverse ducts 24, and a chamferred annular edge 25. A spring 26 located in the end portion 8 of control bore 7 abuts one end of the first control slide 13. Control bore 7 has an annular groove 27 into which pressure conduit 4 opens, and located in a region in which the first control slide 13 has several transverse passages 28 ending in the longitudinal bore 18 which, together with the longitudinal bore 22, 23 of the second control slide 19, opens in a chamber 11 which is connected by return conduit 12 to the container 2. A channel 29 connects the annular groove 27 with the working conduit 31 of the lifting motor 30, 33. A check valve 36, which opens towards the cylinder 30 of the lifting motor 30, 33, is provided in the channel 29. A pressure accumulator 37, serving as a resilient pressure storage for the mowing means 35, is connected by branch conduit 38 with the working conduit 31.

A channel 39 branches off working conduit 31 downstream of check valve 36 and opens into a cylinder bore 40 in housing 5. Cylinder bore 40 opens into a cavity 41 which is connected with the end portion 8 of the control bore 7, and has at its other end a wide chamber portion 42 connected by a channel 43, only partly shown, with a chamber 11 connected with the return conduit 12. The chamber portion 42 is also directly connected by a duct 44 with the cavity 41. Consequently, a continuously open flow line is provided between the end portion 8 of the control bore 7 and the container 2.

A valve member 45 is located in the cylinder bore 40 and has a valve piston 46 provided with an annular recess 47 so that valve member 45 controls the communication between channel 39 and the chamber 11. Piston 46 has a projecting portion 48 abutting a projection 49 of the first control slide 13 due to the action of spring 51 in the wide chamber portion 42. The other end of valve member 45 is formed as a frustoconical closure valve portion 50 which is urged by spring 51 to a position abutting a seat 52 formed in cylinder bore 40.

Figure 2:
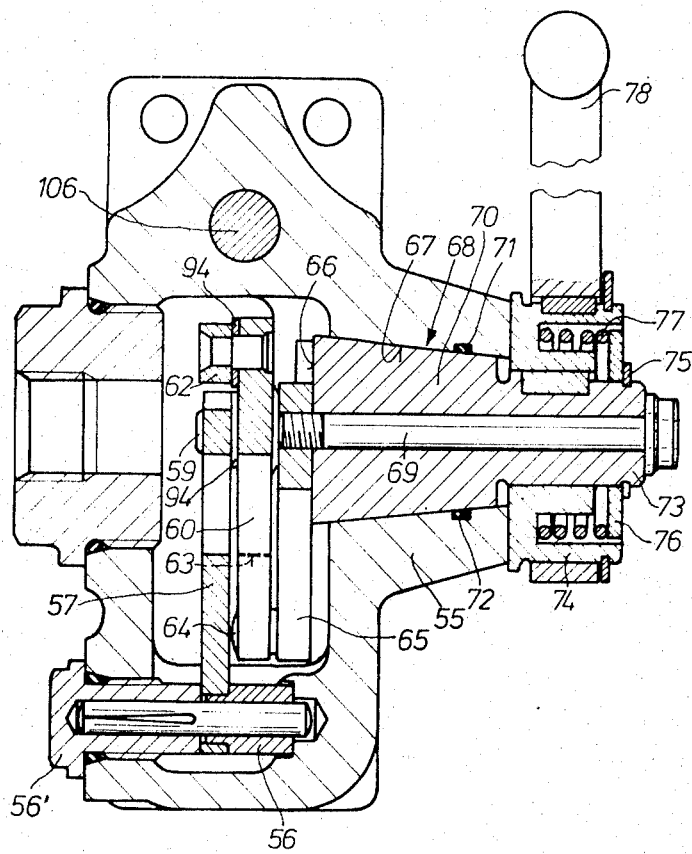
FIG. 2 is a fragmentary cross-section taken along line II—II in FIG. 1 for illustrating the construction of a device for setting the apparatus to a desired height of the mowing means above the ground.

The first control slide 13 has an end portion 53 which projects through chamber 11 and an opening in the wall of housing 55 into the interior of the same. An abutment stud 54 on end portion 53 cooperates with an operating member 57 which is mounted in housing 55 for angular movement about a bushing 56. As shown in FIG. 2, a threaded means 56' urges operating lever 57 into engagement with a shoulder of a bushing 56 on which operating lever 57 is mounted.

Operating lever 57 has a camming surface 58 which is engaged by the abutment stud 54 of the first control slide 13 due to the action of spring 26 in the end portion 8 of control bore 7.

The shape of the camming edge 58 is designed so that the force acting on stud 54 always acts in the direction of the longitudinal axis of control slide 13, and consequently in the direction of movement of the same.

Operating lever 57 is pivotally connected at 59 with a connecting link 60 which has at one end pivot means 61 for connecting link 60 for angular movement with an intermediate link 62, and has at the other end a guide slot 63 in which guide projection 64 slides. Guide projection 64 is provided at one end of a manually operated lever 65 by which the regulating linkage system in housing 55 can be set to a desired position for obtaining a corresponding position of the mowing means 35.

Lever 65 is secured by a threaded bolt 69 to a conical member 70 which is located in a corresponding conical seat 68 of a portion of housing 55. The seat 67 has a circumferential groove 71 receiving a sealing ring 72. The portion 73 of the conical member 70 which projects out of housing 55, supports a hub 74 having a U-shaped profile for small axial adjustment, and connected for turning movement with the conical member 70. Near the outer end of the projecting portion 73, an abutment ring 75 is secured which abuts a disk 76 and limits the longitudinal axial movement of hub 74 away from housing 55. A spring 77 abuts disk 76 at one end, and engages with the other end the bottom of the recess formed in the U-shaped hub 74 so that hub 74 is urged against housing 55. A manually operated lever 78 is secured to hub 74 and can be operated to set the regulating means in housing 55 to a position corresponding to the desired position of the mowing means 35.

Figure 3:
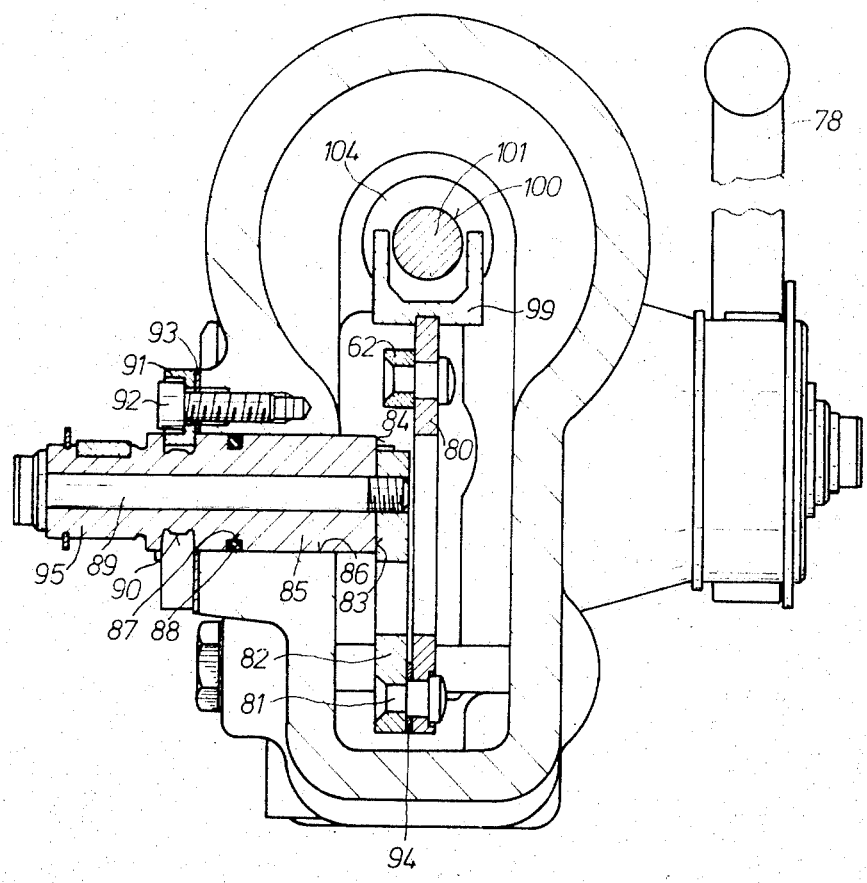
FIG. 3 is a cross-sectional view taken on line III—III of FIG. 1, and illustrates a detail for mounting a location-representing lever.

The intermediate link 62 is pivotally connected at 79 with a regulating means in the form of a lever 80. A pivot means 81 at one end of regulating means 80 is pivotally connected with one end of a lever 82 which is part of location-indicating means which further include a spring-loaded link 96', and another link 96 connected by a pin and slot connection with lever 96', and also connected to the mowing means 35 to respond to displacements of the same to vary the position of lever 82 to influence the position of the regulating means or member 80. The location-indicating movement of lever 82 is limited in one end position by a stop 98 secured to housing 55, as shown in FIG. 1. As best seen in FIG. 3, lever 82 has one end guided in a guide groove 83 provided in the end face 84 of another setting member 85 which operates similarly to the conical setting member 70 as described with reference to FIG. 2. Setting member 85 is mounted in a bore 86 of housing 55 and has within housing bore 86, an annular groove 87 receiving a sealing ring 88. A threaded bolt 89 passes through the setting member 85. Lever 82 is secured to the end of bolt 89 which projects into housing 55. A portion of setting member 85 which projects out of housing 55 is provided with an annular recess 90 which is partly embraced by forked U-shaped member 91 secured by screws 92 to housing 55. Between housing 55 and member 91, one or several spacing disks 93 are placed on the portion of setting member 85 projecting out of the bore, so that the setting member 85 projects into the interior of housing 55 so far that lever 82 is held in a position parallel to the linkages 57, 60, 62, 65, 80.

Furthermore, to avoid friction between the links of the linkages, spacing disks 94 are provided at the articulated pivot means 59, 61 and 81. The regulating linkage means 57, 65, 62, 80, 82 is assembled completely before insertion in assembled condition into the housing 55. The portion of setting member 85 projecting out of housing 55 is extended by an end portion 95 of smaller diameter to which the link 96' is mounted which is connected by link 96 with the mowing means 35, as shown in FIG. 1.

As shown in FIGS. 1 and 3, the regulating member 80 has a free end formed with a forked end portion 99 which partly embraces a circular groove 100 of the pressure-responsive means 101. The rounded front faces 102 and 103 abut an annular shoulder 104 and an annular shoulder 105 of a pressure-responsive piston 101 which has a piston portion 106 slidingly guided in a cylinder bore 107 in housing 55 and has an end face 108 closing a portion of the cylinder bore 107 so that a pressure chamber 109 is formed. The annular shoulder 104 is the end stop for the movement of the pressure-responsive piston 101 into the pressure chamber 109 since shoulder 104 abuts in this end position of pressure-responsive piston 101 on the end of bore 107 in housing 55. The other end of the pressure chamber 109 is formed by a piston 110 which has a blind bore 111 opening on the end face of piston 110 bounding pressure chamber 109, and having a throttling constriction 112 which connects bore 107 with a transverse bore 113. Piston 110 has a circumferential annular groove 114 into which transverse bore 113 opens. A control duct 115 in housing 55 opens in the region of the annular recess 114 in bore 107, and has another end forming a port on an outer end face of housing 55 registering with a portion in a corresponding conduit in housing 5 which communicates with channel 39 downstream of check valve 36. Piston 110 has an annular groove 116 in which a sealing ring 117 is mounted which seals portions 109 and 114 of bore 107, which communicates with lifting cylinder 30 through the working conduits 31 from a recess 118 in housing 55 which communicates with the chamber 11 in housing 5 which is connected with the return conduit 12.

A projection 119 of piston 110 abuts housing 5, and a shoulder 120 of piston 110 is located in the recess 118 at the end of cylinder bore 107, so that piston 110 is held in a normal position.

A shoulder 105 is formed on a head 121 of the pressure-responsive piston 101. A spring 122 abuts the head 121 at one end, and abuts an adjustable disk 123 at the other end. Disk 123 is screwed into a bore of housing 55. Adjusting member 123 has a square opening 125 through which a square prismatic member 126 extends so that turning of member 123 moves the prismatic member 126 into and out of the housing bore 124. Since member 123 is in abutment for spring 122, the pretension of spring 122 is adjusted in this manner.

Prismatic member 126 has an end portion 127 which is mounted in a bore 128 of a housing cover 129. Cover 129 is screwed into the housing bore 124 and closes housing 55. Porjection 127 has an annular recess 130 in which a sealing ring 131 is mounted. The end of projection 127 which projects through the cover 129, carries a counter nut 132 for securing member 126 and thereby adjusting member 123 in a desired position. The end face 133 of member 126 serves as an end stop for the pressure-responsive piston 101, when piston 101 is in an end position farthest withdrawn from the pressure chamber 109.

In the neutral position of the control valve means 6, the pressure fluid pumped by pump 1 flows through pressure conduit 3 and pressure channel 4 into the annular groove 27 which is connected with control chamber 17 by the annular recess 14 and channels 15 and 16. Fluid in the control chamber 17 presses against the second control slide 19 and holds the same outside of control chamber 17 against the action of spring 20. Pressure fluid pumped by pump 1 through conduits 3, 4 into the annular groove 27 can freely flow into chamber 11 through the transverse bores 28 of the first control slide 13 and the transverse bores 24 and the longitudinal bores 22, 23 of control slide 19. From chamber 11, the pressure fluid flows through the return conduit 12 back into the container 2. Check valve 36 remains closed, so that no pressure fluid is supplied to the lifting cylinder 30 through conduit 31.

Valve member 45 is in a closed position so that no pressure fluid can flow out of lifting cylinder 30 to the return conduit means 42, 43, 11, 12, 2.

The pressure-responsive piston 101 is in a position substantially equally spaced from its end positions determined by the end face 133 of prismatic member 126, and the housing portion at the end of bore 107. The pressure forces applied by the pressure fluid in the pressure chamber 109 and the pressure of spring 122 are equal and act opposite to each other. Part of the weight of the mowing means 35 is supported by lifting piston 33 in lifting cylinder 30, while the remaining weight rests on the ground on which the mowing means 35 slides during movement of the harvester.

It is preferred to cut certain grains with a cutter sliding on the ground, so that as much of the stalk is cut off as possible. The part of the weight of the mowing means 35 sliding on the ground and supported by the same, is adjusted so that the support of the mowing means 35 neither digs into the ground, nor is lifted off the same. This distribution of weight is obtained by adjusting by means of the manual lever 78, and thereby lever 65 while the first control slide 13 is in a neutral position. The pressure in lifting motor 30, 33 is maintained at a constant value, so that the mowing means 35 follows the ground contour.

When the mowing means 35 meets a higher ground portion, it is turned about its shaft 97 in counterclockwise direction, and moves piston 33 out of cylinder 30 of the lifting motor. This causes a pressure drop in cylinder 30 and in pressure chamber 109, which is connected with lifting cylinder 30 by bores 111, 112, 113, recess 114, conduit 115, and working conduit 31. When the pressure in pressure chamber 109 drops, the force of spring 122 overcomes the pressure in pressure chamber 109, and the pressure-responsive piston 101 is moved into the pressure chamber. The shoulder 105 of pressure-responsive piston 101 exerts pressure on the end face 103 of the forked portion 99 of the regulating means 80. Since regulating means 80 is mounted at one end of the lever 82 which by its position indicates the location of the mowing means 35, and abuts during pressure regulation on the stop 98, the regulating means 80 turns about pivot means 81 in counterclockwise direction, Intermediate link 62 which is pivotally connected and operated by regulating means 80, moves connecting link 60 about the guide projection 64 in counterclockwise direction. Operating lever 57, which is pivotally connected at 59 with connecting link 60, is turned about its pivot 56 to press against the abutment stud 54 of the end portion 53 of the first control slide 13, so that the same is moved out of its neutral position towards its lifting position against the action of spring 26 in the end portion 8 of control bore 7. Due to this movement of control slide 13, the annular recess 14 moves to a position communicating with end portion 8 of control bore 7 and with cavity 41 which communicates with the return conduit means 41, 44, 42, 43, 11, and 12. Pressure fluid flows now out of chamber 17 through channels 15 and 16 and annular recess 14 into end portion 8 and to the container 2. The annular recess 14, which communicates now with end portion 8 of bore 7, is separated from the annular groove 27 which communicates with the pump 1 through pressure conduits 3, 4, and consequently without pressure.

Spring 20 urges control slide 19 into control chamber 17, and moves the transverse bores 24, and the chamferred edge 25 of control slide 19 out of communication with the transverse bore 28 of control slide 13, so that the pressure supply conduit means 3, 4, 27, 28 is separated from the return conduit means 24, 22, 23, 11, 12.

Pressure fluid from pump 1 flows through the annular groove 27 into channel 29, and through the opened check valve 37 into channel 29 and through working conduit 31 to the cylinder 30 of the lifting motor 30, 31.

At the same time, pressure fluid flows also through conduit 115, annular recess 114, and bores 113, 112, and 111 into the pressure chamber 109 so that the pressure in pressure chamber 109 and in lifting cylinder 30 is increased. When the pressure reaches the selected desired value, pressure-responsive piston 1 is displaced out of pressure chamber 109 against the action of spring 122 until the forces acting on the pressure-responsive piston 101 are balanced and in a condition of equilibrium. Due to the movement of pressure-responsive piston 101, the regulating means 80 is turned about pivot means 81 in clockwise direction, opposite to its previous movement. The motion is transmitted through intermediate link 62 and connecting lever 60 so that operating lever 59 is also turned in clockwise direction. Spring 26 urges control slide 13 with end portion 53 and abutment stud 54 to follow the movement of the camming edge 58 of operating lever 57 so that control slide 13 moves back toward chamber 11 to its neutral position in which the annular recess 14 is separated from the end portion 8 of the bore 7, and connected with the annular groove 27 which communicates with the pressure conduit means 3, 4 so that pressure fluid flows through the annular recess 14 and channels 15 and 16 into chamber 17. Comparatively small pressure in chamber 17 is sufficient to shift control slide 19 against the force of spring 20 out of chamber 17 so that the transverse bores 24, 28 of the control slides 19, 13 are connected, and the pressure fluid circulates in conduit means 3, 4, 27, 28, 24, 22, 23, 11, 12, 2 in a flow which takes place in a neutral position of the control means. The pressure fluid supplied through working conduit 31 to the lifting motor 30, 33 is again sufficient to support mowing means 35 to a certain extent so that only part of the weight of the mowing means 35 is supported on the ground.

When the mowing means 35 encounters a depression in the ground, it turns in clockwise direction about shaft 97, following the ground contour. Piston 33 is pressed into cylinder 30 of the lifting motor, and the pressure rises in cylinder 30 and in the communicating pressure chamber 109. Due to the increased pressure in pressure chamber 109, increased pressure acts on the end face 108 of pressure-responsive piston 101, and pushes the same out of pressure chamber 109 against the action of spring 122. The flange 104 of pressure-responsive piston 101 presses against the end face 102 of the fork-shaped portion 99 of regulating means 80, which is turned about pivot means 81 in clockwise direction. The movement of regulating means 80 is transmitted through intermediate link 62 and the connecting lever 60, which turns about pivot means 64, so that operating means 57 turns about pivot means 56 also in clockwise direction. The camming surface 58 of operating lever 57 begins to move away from abutment stud 54, but due to the action of spring 26 on control slide 13, 53, 54, the abutment stud 54 follows the camming edge 58 with control slide 13 which is displaced out of its initial neutral position toward a position associated with lowering the mowing means 35. The second control slide 19 remains in the same position in relation to the first control slide 13 as in the neutral position of control slide 13, so that pressure fluid continued to be pumped by pump 1 flows as described above for the neutral circulation back into container 2. The control slide 13, displaced out of its neutral position, presses with its projection 49 against the end portion 48 of the valve member 46 and moves the same into the widened chamber portion 42 of the longitudinal bore 40. The closure valve portion 50 is retracted from the seat 52, and pressure fluid from lifting cylinder 30 and from pressure chamber 109 flows through channels 29, 39, or 40, 42, and channel 43 into chamber 11 and from there through the return conduit 12 into container 2 so that the pressure in the lifting cylinder 30 and in the pressure chamber 109 drops.

The force of spring 122 is sufficient to press the pressure-responsive piston 109 back into the pressure chamber 109, while the shoulder 105 of pressure-responsive piston 101 moves regulating means 80 about its pivot means 81. As described above, the operating lever 57 is also turned in counterclockwise direction by the action of levers 62 and 60, so that the camming edge 58 acts on the abutment stud 54 on end portion 53 of control slide 13, moving control slide 13 against the action of spring 26 back toward its neutral position. The projection 49 of the control slide 13 moves farther into the cavity 41, and spring 51 moves valve member 46 to a position in which the closure valve portion 50 abuts the seat 52. Channels 29, 39 are thus again separated from the return conduit means 42, 43, 11, 12, 2, and no pressure fluid can flow out of lifting cylinder 30 or of pressure chamber 109, while the above-described neutral circulation of the pressure fluid pumped by pump 1 is maintained.

If tall grain is cut, and the cutting of straw is undesired, the grain is not cut directly adjacent the ground. Also, if variations of the cutting height caused by small contour variations of the ground are of no importance, or if the ground is rocky and the cutter is in danger of being damaged by the rocks, it is not necessary to partly support the mowing means 35 on the ground surface and lifting motor 30, 33 carries the entire weight of the mowing means 35. In this event, the pressure in the pressure chamber 109, which communicates through conduits 115 and 31 with the cylinder 30 of the lifting motor, is then so high that the pressure-responsive piston 101 moves out of the pressure chamber 109 to an end position abutting the end face 133 of the prismatic stop member 126. Since the forked end portion 99 of regulating means 80 is in this end position held between the flange 104 and the shoulder 105, a pivot support is obtained for the end of regulating means 80 carrying the forked end portion 99.

A particular position of the manually operated lever 78 corresponds to each selected height above the ground of the mowing means 35, also represented by the position of the mowing means 35 in relation to the supporting frame of the harvester.

By operation of manual lever 78 by the driver (see FIG. 2) by means of hub 74 and conical setting member 68, lever 65, which represents a desired position, is turned about shaft 69, for example in clockwise direction, as viewed in FIG. 1. The guided projection 64 moves then connecting lever 60 about pivot means 61 so that operating lever 57 and its camming edge 58 are urged toward the abutment stud 54 of control slide 13, 53 so that control slide 13 is moved against the action of spring 26 out of its neutral position to the above-described lifting position so that the mowing means 35 is turned about shaft 97. A location-indicating means 96, 96' operates through the setting member 85, see FIG. 3, the location-indicating member 82 in counter-clockwise direction about shaft 89 so that regulating means 80 turns about its forked end portion 99. The intermediate lever 62 which is connected with regulating means 80 at the pivot means 79, also turns and turns connecting lever 60 in clockwise direction about guide projection 64. Operating lever 57 is also turned in clockwise direction about shaft 56. Control slide 13, whose abutment stud 54 is pressed by spring 26 against camming surface 58 of operating lever 57, is controlled by operating lever 57 to move out of the lifting position back to the neutral position, in which lifting cylinder 30 is again closed, and the pressure fluid pumped by pump 1 flows in the neutral circulation back to container 2.

If a lower cutting height than the adjusted cutting height is required, the driver moves the manual lever 78 in clockwise direction to a new position corresponding to the new location of mowing means 35 in relation to the frame 32. Lever 65, which represents the desired location, is turned by setting member 68 and hub 74 acting on the same, in clockwise direction about shaft or bolt 69. The guiding projection 64 turns the connecting lever 60 about the fixed pivot 61 in clockwise direction, so that operating lever 57 is also turned. Control slide 13 can now be moved by spring 26 out of the neutral position to a position associated with lowering the mowing means 35, while abutment stud remains in contact with the camming edge 58. The neutral circulation for the pressure fluid pumped by pump 1 is maintained, while pressure fluid flows from lifting cylinder 30 into container 2, as described above, while the mowing means 35 is lowered until reaching a height corresponding to the desired height set by operation of the manual lever 78. The regulating device 80, 82, 62, 57 places control slide 13 then again in its neutral position.

For the transition from the pressure regulation during which the mowing means 35 slides on the ground, to the position regulation during which the mowing means 35 is completely carried by the lifting motor 30, and vice versa, the driver only places the manually operated lever 78 in a position corresponding to the desired cutting height and the respective position of the mowing means 35 in relation to the frame 32 of the harvester, or in a position corresponding to the desired pressure in the lifting motor 30, 33. The manual lever 78 is arranged in such a manner that the cutting height is the greater, the more the manual lever 78 is turned out of a vertical position in clockwise direction. In the farthest turned position of the manual lever 78, the mowing means 35 is lifted to a transporting position in which no cutting is intended during the movement of the harvester. During the position-dependent regulation, the head 121 of the pressure-responsive piston 101 abuts the end face 133 of the adjustable stop 126. During the transition from the location-depending regulation to the pressure-depending regulation, and vice versa, the pressure-responsive piston 101 still abuts, or already abuts on stop 126, while the location-indicating lever 82 already, or still, abuts the stop 98.

During pressure-responsive regulation, only lever 82 abuts stop 98, and pivot means 81 provides the turning axis for regulating means 80. During working on a field, the driver, upon arriving at the border of the field, turns the manual lever 78 to the "transporting" position, and before the harvester has turned around, mowing means 35 is already raised to the high inoperative transporting position. For mowing a swath, it is only necessary to place the manual lever 78 in the position associated with the desired cutting height, which may be indicated by a graduated scale or mark.

Since each position of the manual lever 78 is associated with a specific height of the mowing means 35 during location regulation, and with a specific pressure in lifting cylinder 30 during pressure regulation, it is necessary to arrest the manual lever 78, whose position represents the desired value, by simple means in any position to which it was set. In a preferred embodiment of the invention, arresting means for the manual lever 78 and the lever 65, which represents the desired value, are used. The conical seat 68 and the setting member 70, see FIG. 2, are urged by spring 77 arranged in hub 74 to move the conical setting member 70 into the conical bore 67 so that the setting member 70 is held by friction in the housing bore 67. At the same time, spring 77 presses against the bottom of the recess in hub 74 so that additional friction forces between hub 74 and housing 55 increase the arresting forces acting on the lever 65 which represents the desired value. Since during rough field conditions, it often happened that during shifting of manual lever 78 the same is moved at a slant to hub 74, the described arresting arrangement has the advantage that even when the manual lever 78 is subjected to an oblique load, either the conical setting member 70 is pressed into the conical bore 67, or the hub 74 is pressed against the housing 55 so that the arresting friction forces can only be increased, but never decreased. The particularly advantageous arrangement of the regulating device in housing 55, which is secured by screws to the housing 5 and the control means 6 in the same, results in a compact structure which has the substantial advantage that intermediate connecting conduits, sealing means, and attaching means can be omitted, which would otherwise be required. Due to the simple adjustment means 127, 129 for the spring 122, the same hydraulic lifting arrangement with the same spring 122 can be used for mowing means 35 having very different weight, and cutting very different types of grains. Furthermore, the length of the pressure-responsive means always remains the same in the construction of the invention. It is advantageous to use a spring 122 which has a curved characteristic of the spring force, and due to the above-described construction of the adjustment means for spring 122, the result is obtained that the regulating range of the apparatus, and thereby the exactness of the regulation, is adapted to any used mowing means.

It will be understood that each of the elements described above, or two or more together, may also find a useful application in other types of control apparatus for the mowing means of a harvesting machine differing from the types described above.

While the invention has been illustrated and described as embodied in a control apparatus for controlling the lifting motor of a harvesting machine in accordance with ground conditions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Control apparatus for the mowing means of a harvesting machine, comprising a hydraulic lifting motor; mowing means at least partly supported by said lifting motor and located on the ground; a first housing, and a second housing secured to said first housing adjacent the same; conduit means partly located in said first housing and connected with said lifting motor, and including a conduit in said second housing; control valve means located in said first housing for controlling the flow of fluid under pressure through said conduit means to said lifting motor, said control valve means including a control valve slide means having a portion projecting out of said first housing and into said second housing; a source of pressure fluid supplying pressure fluid to said control valve means; pressure-responsive means located in said second housing and including a pressure chamber connected by said conduit with said conduit means in said first housing for permitting said pressure-responsive means to sense the pressure in said lifting motor, said pressure-responsive means including a pressure cylinder, a pressure-responsive piston forming in said pressure cylinder said pressure chamber communicating with said conduit and conduit means, and pressure spring means urging said pressure-responsive piston into said pressure chamber and having a curved spring force characteristic, and means for adjusting said spring means; a regulating device in said second housing including a movable regulating means connected with said pressure-responsive means, location-representing means connecting said mowing means with the other end of said regulating means, and operating means connected with and controlled by said regulating means and engaging said projecting portion of said control valve means for operating the same, a load variation of said lifting motor due to ground conditions causing said pressure-responsive means and said location-representing means to place said regulating means in a regulating position controlling said operating means to operate said control valve means to control the flow of pressure fluid to said lifting motor to effect a pressure adjustment of said lifting motor compensating the load variation; and manually operated means connected with said regulating means for setting said regulating device to a desired position.

2. Control apparatus as claimed in claim 1, wherein said regulating means has one end pivotally connected with said pressure-responsive means, wherein said location-representing means include lever means pivotally connected with the other end of said regulating means, and wherein said regulating device includes an intermediate link pivotally connected at one end with said regulating means intermediate the ends thereof, and a connecting link pivotally connecting the other end of said intermediate link with said operating means;

3. Control apparatus as claimed in claim 2, wherein said regulating means, said lever means of said location-representing means, said intermediate link, said connecting link, and said operating means are pivotally connected to form a preassembled linkage which is mounted as an assembled unit in said second housing.

4. Control apparatus as claimed in claim 1, comprising threaded attaching means for securing said first and second housings to each other; wherein said first housing is formed with return conduit means controlled by said control valve means, said return conduit means including a chamber open one side of said first housing and being closed by a wall of said second housing.

5. Control apparatus as claimed in claim 1, wherein said means for adjusting include a disk supporting one end of said pressure spring means and being threaded into said second housing, and comprising a stop member surrounded by said spring means and having one end adjustably mounted on said disk and an other end cooperating with said pressure-responsive piston for stopping the same in an end position, said stop member having at said one end a portion projecting out of said second housing, and means for securing said projecting portion in an adjusted position of said stop member to said second housing.

6. Control apparatus as claimed in claim 1, wherein said regulating device includes a stop fixed to said second housing for stopping said location-representing means for operation of said regulating means by said pressure-responsive means while said location-representing means is ineffective; and wherein said pressure-responsive means includes another stop for stopping said pressure-responsive means in a position in which said regulating means is controlled only by said location-representing means; and wherein when said location-representing means and said pressure-responsive means engage said stops, respectively, at the same time, said mowing means is almost totally supported by said lifting motor and just slidingly touches the ground.

7. Control apparatus as claimed in claim 1, wherein said operating means has a camming edge and is mounted for turning movement under the control of said regulating means; and wherein said control valve means include a spring-biased control slide having an abutment projecting out of said first housing into said second housing and being engaged by said camming edge, the direction of movement of said control slide being in any position of said control slide and of said operating means perpendicular to said camming edge.

8. Control apparatus as claimed in claim 1, wherein said regulating means is turnable and has a forked end portion with curved faces; and wherein said pressure-responsive piston has first and second abutments forming an annular recess in which said forked end portion is located so that said regulating means is turned by said pressure-responsive piston means while said curved faces slide on said first and second abutments, respectively.

9. Control apparatus as claimed in claim 1, wherein said pressure-responsive means includes a fixed end member closing one end of said pressure cylinder, said fixed end member having a throttling passage connecting said pressure chamber with said conduit, said conduit being partly located in said second housing and partly in said first housing communicating through said conduit means with said lifting motor so that the pressure in said lifting motor influences the pressure in said pressure chamber acting on said pressure-responsive piston; and wherein said pressure-responsive piston is operatively connected with said regulating means.

10. Control apparatus as claimed in claim 1, wherein said regulating means is a regulating lever having one end connected with said pressure-responsive means, wherein said location-representing means includes a location-representing lever pivotally connected with the other end of said regulating lever, wherein said regulating device includes an intermediate link pivotally connected at one end with said regulating lever intermediate the end thereof, and a connecting link pivotally connected at one end with the other end of said intermediate link, a lever for representing a desired value, manually operated means for setting said value-representing lever, said connecting link having a guideway and said value-representing lever has a guiding projection guided in said guideway, a shaft secured to said value-representing lever, a setting member carried by said shaft and located in a bore of said second housing and having an end portion projecting out of said second housing, and an other end portion located in said second housing and formed with a guideway in which said value-representing lever is non-rotatably mounted.

11. Control apparatus as claimed in claim 10, wherein said bore and said setting member have conical surfaces in friction contact with each other, wherein said manually operated means includes a manual lever, and a hub means secured to said manual lever and mounted on said projecting end portion of said setting member, and a spring abutting at one end on said hub means and at the other end on an abutment on said projecting end portion of said setting member.

12. Control apparatus as claimed in claim 11, wherein said regulating device includes a bolt, another setting member surrounding said bolt and mounted in said second housing, threaded means securing said other setting member to said bolt and to said location-representing lever, said setting member having an end portion in said second housing formed with a guideway in which said location representing lever is non-rotatably located, and another end portion projecting out of said second housing and operatively connected with said mowing means.

13. Control apparatus as claimed in claim 12, wherein said other end portion of said other setting member has an annular recess; said regulating device comprising an adjusting member mounted on said second housing and engaging said annular recess, and at least one disk between said adjusting member and said second housing for adjusting the position of said adjusting member and of said other setting member relative to said second housing.

* * * * *